UNITED STATES PATENT OFFICE.

LUCIEN DUPONT, OF VINCENNES, FRANCE, ASSIGNOR TO HIMSELF AND SOCIÉTÉ DARRASSE FRERES, OF PARIS, FRANCE.

PROCESS FOR THE UTILIZATION OF MARINE ALGÆ FOR THE MANUFACTURE OF ACETIC AND BUTYRIC ACIDS.

1,371,611.     Specification of Letters Patent.     Patented Mar. 15, 1921.

No Drawing.     Application filed March 6, 1919. Serial No. 280,946.

*To all whom it may concern:*

Be it known that I, LUCIEN DUPONT, a citizen of the Republic of France, residing at Vincennes, Seine, France, have invented Processes for the Utilization of Marine Algæ for the Manufacture of Acetic and Butyric Acids.

This invention relates to a process of utilization of marine algæ or sea-weeds for the manufacture of acetic, and butyric acids and for the extraction of salts of iodin and potash.

If marine algæ such as they are obtained from the sea or after they have been sterilized, are fertilized or sown with suitable microbe cultures which may be either pure and selected cultures, or bacteria found on the algæ themselves, or cultures obtained from media already in fermentation and fed by algæ, it is possible, by working in temperature conditions suitable for the proliferation of bacteria, that is to say between 30° and 55°, to bring about formation of organic acids at the expense of the hydrocarbon matter of the algæ.

It is absolutely essential to neutralize the acidity produced in order to enable fermentation to continue. When the fermentation is at an end, there will be found a solution of alkaline salts or of salts of alkaline earths or metals, according to the nature of the base which has been used for neutralization and which may be for instance oxids, hydrates, carbonates or any other desired basic salts of an alkaline metal, of an alkaline earth or even of metals such as zinc and the metals of the zinc and iron group.

The presence and the proportions of the formic, acetic, butyric acids obtained in the above manner, vary according to the kinds of microbes utilized, to the degree of acidity or of alkalinity maintained during the fermentation, and to the alkali used for neutralization.

The solution of the alkaline salts also contains the mineral salts that were contained in the algæ, more particularly the salts of iodin and potash which are very valuable.

Chemical methods make it possible to separate all these substances from each other, to bring them to a pure state suitable for commerce.

*Example.*—Take 1000 kilograms of fresh algæ, sow at 35° with fertilized earth fertilized with sea-wrack, stir during the fermentation and maintain slightly alkaline reaction of the medium by addition of sodium carbonate. When the fermentation is at an end, separate the saline liquor from the cellulosic waste which can be utilized elsewhere: acidify by means of a strong acid such as sulfuric or hydrochloric acid, distil the organic acids. Treat the saline residue so as to obtain potash and iodin salts. Separate the organic acids. In this way will be obtained 80 kg. of acetic acid and 40 kg. of butyric acid, 1.5 kg. of iodin and the corresponding potash salts.

Claims:

1. A process for utilizing organic matter contained in marine algæ, which comprises subjecting algæ to aceto-butyric fermentation, and distilling off the acetic and butyric acids formed.

2. A process according to claim 1 further characterized by neutralizing the acidity of fermenting mass during fermentation, and acidifying after the completion of the fermentation to convert the acetic and butyric salts to the respective acids.

In witness whereof, I have hereunto signed my name in the presence of two subscribing witnesses.

LUCIEN DUPONT.

Witnesses:
JOHN F. SIMONS,
RENÉ BARDY.